US006916382B1

(12) United States Patent
Aldredge

(10) Patent No.: US 6,916,382 B1
(45) Date of Patent: Jul. 12, 2005

(54) WIPE PAD FOR COOKING GRILL

(75) Inventor: W. Keith Aldredge, Dacula, GA (US)

(73) Assignee: Grate Chef, LLC, Dacula, GA (US)

( * ) Notice: Subject to any disclaimer, the term of this patent is extended or adjusted under 35 U.S.C. 154(b) by 88 days.

(21) Appl. No.: 10/379,506

(22) Filed: Mar. 4, 2003

(51) Int. Cl.$^7$ ................................................ A47L 13/17
(52) U.S. Cl. ...................... 134/6; 15/104.93; 15/104.94; 118/264; 118/DIG. 8; 426/132
(58) Field of Search .......................... 15/104.93, 104.94, 15/209.1, 210.1, 229.11, 229.12, 229.13, 247; 118/264, DIG. 8; 426/132

(56) References Cited

U.S. PATENT DOCUMENTS

| | | | | |
|---|---|---|---|---|
| 1,973,093 A | * | 9/1934 | Moore | 15/210.1 |
| 2,871,497 A | | 2/1959 | Miller et al. | 15/244.1 |
| 3,085,372 A | * | 4/1963 | Sweeney et al. | 401/196 |
| 3,434,175 A | * | 3/1969 | Bray | 15/105 |
| 3,629,896 A | | 12/1971 | Sirnec | 15/118 |
| 4,018,575 A | | 4/1977 | Davis et al. | 51/295 |
| 4,027,350 A | | 6/1977 | Kotche | 15/104.93 |
| 4,674,237 A | | 6/1987 | Sullivan | 451/523 |
| 5,479,673 A | | 1/1996 | Carton | 15/111 |
| 5,671,498 A | | 9/1997 | Martin et al. | 15/244.3 |
| 5,814,396 A | | 9/1998 | Weidner et al. | 428/213 |
| 6,023,810 A | | 2/2000 | Gessert | 15/229.13 |
| 6,192,545 B1 | | 2/2001 | Gessert | 15/229.13 |
| 6,315,482 B1 | | 11/2001 | Girardot et al. | 401/266 |
| 6,547,468 B2 | | 4/2003 | Gruenbacher et al. | 401/133 |

OTHER PUBLICATIONS

Raichlen, Steven; *How to Grill;* "Some Final Tips", p. 26, 27; Workman Publishing, New York, 2001.
"America's Love Affair With Barbecuing Just Keeps On Glowing", Hearth, Patio & Barbecue Association, Suite 1001, 1601 North Kent Street, Arlington, VA 22209 (Mar. 4, 2002).

* cited by examiner

*Primary Examiner*—Mark Spisich
(74) *Attorney, Agent, or Firm*—Baker, Donelson, Bearman, Caldwell & Berkowitz

(57) ABSTRACT

A wipe pad (10) for cleaning debris from cooking grate (24) while preparing the cooking grate for use in cooking foods, in which the wipe pad has a sheet of an absorbent fire retardant material with a cooking agent (18) received by the sheet. The sheet, being attached to a grill brush (26) by a plurality of bristles (32) extending therefrom and partially penetrating the sheet, clings to the grill brush (26) for wiping contact of the sheet against the grate (24) upon movement of the grill brush to clean cooking debris from the cooking grate while communicating a film of the cooking agent from the sheet to prepare the cooking grate for use. A method of preparing a cooking grate for cooking is disclosed.

21 Claims, 1 Drawing Sheet

WIPE PAD FOR COOKING GRILL

TECHNICAL FIELD

The present invention relates to wipe pads for cooking grills. More particularly, the present invention relates to wipe pads that clean cooking grills while depositing cooking oil to the cooking grill.

BACKGROUND OF THE INVENTION

Cooking of foods uses a variety of heating devices such as ovens, stovetops, microwaves, and grills, among other devices. The pans and grates holding the food are placed in communication with heat in order to increase the temperature of the food and thereby cook the food to an appropriate eating condition. Cooking food with grills has become increasingly popular, and a variety of grill devices have been provided, including outdoor and indoor types with the grills heated by charcoal, flammable gas, and other heat emitting sources.

Outdoor cooking with grills has become increasingly popular. Outdoor grills typically use charcoal or flammable gas as a source of heat. The source of heat is separated by a appropriate distance from a metal grill or grate on which the food sits during the cooking process. Once the food is cooked, persons often leave the grill in order to eat while the food is hot. The grill then cools as the flame is removed by the charcoal dying or the gas being turned off.

While the grill properly should be cleaned after use, typically grills are not cleaned. Food, juices, and other debris collect on the grills. Often there is a need to clean the debris from the grates before cooking can begin. Typically, this is accomplished with a wire brush that scrubs away the majority of the burnt-on debris. Often, however, smaller deposits of carbon and food debris remain on the grates. Cleaning such debris and particles from the grates is important as such particles and debris have been considered unhealthy for consumption.

Typically, to clean the grate prior to cooking involves preheating the grill to an elevated temperature. The heated grate is then cleaned by brushing with a metal bristle brush to dislodge debris and the like. Generally, this removes most of the debris. Other debris however becomes baked on and becomes a surface in contact with other foods being cooked on the grate In addition to cleaning the grill prior to cooking, some cooks also treat the food to be cooked with cooking agents such as vegetable oil, canola oil, seasonings, and the like. The oils facilitate the cooking of the food while the seasonings enhance the flavor. For example some restaurant grill cooks put oil on a cloth and wipe the cloth over the grill after cleaning in order to provide a oiled surface for cooking. Recently, oil has been provided in aerosol spray form for use with grills. Seasonings are typically sprinkled or brushed onto the foods prior to cooking.

While oil and seasonings are useful with cooking, application may be difficult. The spray may flare or flash with a hot flame heat source. A hot grill restricts distance and time for holding a cook's hand or arm near the grill.

Accordingly, there is a need in the art for an improved cooking grill cleaning device that facilitates cleaning cooking surfaces while assisting with oiling the cooking surface and seasoning of foods cooked thereon. It is to such that the present invention is directed.

BRIEF SUMMARY OF THE INVENTION

The present invention meets the need in the art by providing a wipe pad for cleaning debris from cooking grills while preparing the cooking grill for use in cooking foods, comprising a sheet of an absorbent fire retardant material with a cooking agent received by the sheet. The sheet, being attached to a grill brush by a plurality of bristles extending therefrom and partially penetrating the sheet, clings to the grill brush for wiping contact of the sheet against the grate upon movement of the grill brush to clean cooking debris from the cooking grill while communicating a film of the cooking agent from the sheet to prepare the cooking grill for use.

In another aspect, the present invention provides a method of preparing a cooking grill for use in cooking foods, comprising the steps of:

(a) attaching a sheet of an absorbent fire retardant material to a handle by partially piercing the sheet with a plurality of bristles extending from the handle, the sheet receiving a cleaning and cooking agent;

(b) moving the handle to bring a surface of the sheet into moving contact with a cooking grate, while the cleaning and cooking agent communicates from the sheet to cooperatively dislodge debris in cleaning the cooking grate while leaving a film of the cooking agent thereon for cooking foods.

Objects, advantages and features of the present invention will become apparent from reading of the following detailed description of the invention and claims in view of the appended drawings.

DETAILED DESCRIPTION

Figure 1:
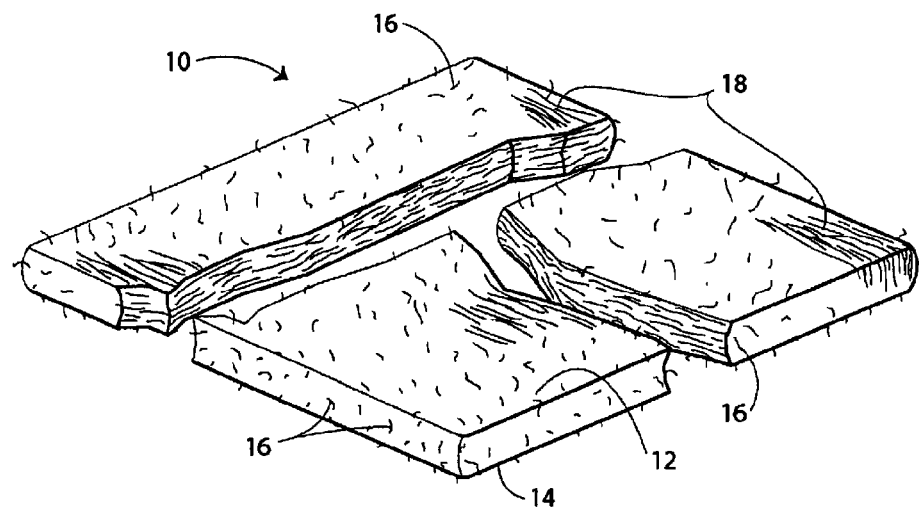
FIG. 1 is a perspective pictorial view of a wipe pad for cleaning and preparing a cooking grate for use according to the present invention.

Referring now in more detail to the drawings, in which like numerals indicate like parts throughout the several views, FIG. 1 illustrates in perspective cut-away view a wipe pad 10 according to the present invention. The wipe pad 10 comprises a sheet of an absorbent fabric having opposing major surfaces 12, 14 with a thickness minor relative to the length and width of the wipe pad. The fabric of the wipe pad 10 is needle-punched such that a plurality of fibrous latches 16 extend from the major surfaces 12, 14 and edges of the wipe pad 10. The latches 16 are fine fibers known as "felting". The fibers or latches 16 extend outwardly from the fabric sheet with the fibers within the sheet generally mechanically interlocked by the needle-punching process. The wipe pad 10 receives a cooking agent 18, such as a pure vegetable oil, which is absorbed by and held within the wipe pad.

Figure 2:
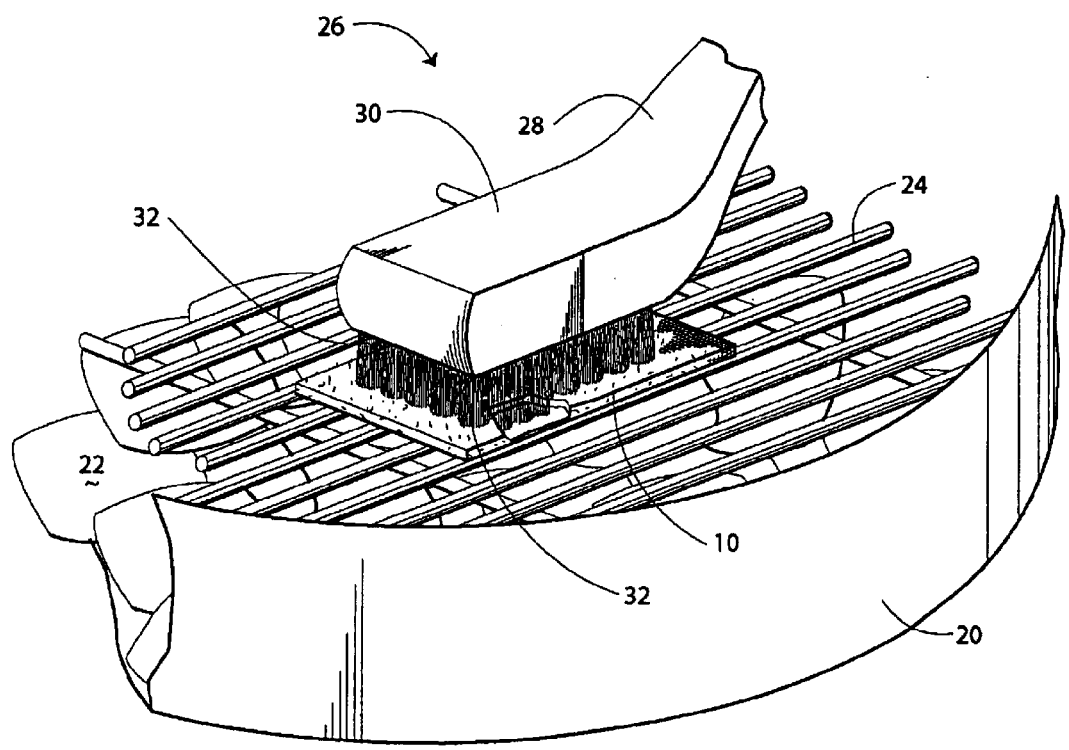
FIG. 2 is a pictorial view of the wipe pad illustrated in FIG. 1 attached to a handle for cleaning and preparing a cooking grate for cooking foods.

FIG. 2 is a perspective view of a portion of a cooking grill generally 20 having a heat source, such as coals 22 or gas flame (not illustrated). The grill 20 includes a grate 24 on which food is placed for cooking. The wipe pad 10 discussed above selectively attaches to a grill cleaning brush 26 having a handle 28 and a head portion 30 from which a plurality of wire bristles 32 extend. In the illustrated embodiment, the bristles 32 are gathered into groups and the groups are spaced-apart. The grill brush 26 detachably engages the wipe pad 10. As illustrated in partial cut-away view, the bristles 32 of the grill brush 26 partially penetrate the wipe pad 10. The bristles 32 typically are disposed upon entry at slightly varying angles relative to a plane defined by the major surface of the wipe pad 10. This varied angled engagements facilitates securing the wipe pad 10 to the grill cleaning brush 26. Further, the latches 16 wrap around and engage the bristles 32. The latches 16 thereby further secure the wipe pad 10 to the grill cleaning brush 26.

With reference to FIG. 2, the wipe pad 10 according to the present invention is used to clean cooked food and debris from the grate 24 while also applying a film of the cooking agent 18 to the grate. This is accomplished by preheating the grill 20. Preheating the grill 20 is a typical function in cooking with a grill. High heat temperature is required in order to achieve seared crust, charcoal flavor, and handsome grill marks on cooked food. Generally, charcoal is at the proper temperature when the coals are covered with a thin coat of gray ash. Typical grills require preheating of approximately 15 to 20 minutes.

The grill brush 26 may first be used to scrape or brush major debris off of the grate 24 with the bristles 32. The grill brush 26 is moved across the grate 24. The bristles 32 scrape across the grate 24 to remove dirty, old or burnt bits of food or other particles stuck on the grate. Although not illustrated, an edge of a metal spatula or a metal scraper attached to the grill brush 26 may be used to scrape off large burnt-on particles.

After initial scraping of the grate 24, the grill brush 26 detachably engages the wipe pad 10, as illustrated in FIG. 2. This is accomplished by removing the wipe pad 10 from its package. The wipe pad 10 is then secured to the grill brush 26 by firmly pressing the bristles 32 against one of the major surfaces 12, 14 of the wipe pad 10. The distal ends of the bristles 32 extend partially into the wipe pad 10, as illustrated in partial cut-away view. The grill brush 26, however, should not be pushed such that the distal ends of the bristles 32 extend through the opposing side of the wipe pad 10, but rather remain within the interior of the wipe pad 10. The plurality of latches 16 further wrap around and engage the bristles 32.

The grill brush 26 is moved in order to rub the wipe pad 10 against the grate 24. The major surface of the wipe pad 10 outwardly of the grill brush 26 dislodges or cleans remaining carbon particles or foods from the grate 24. While this is happening, the pressure of the grill brush 26 causes the cooking agent 18 within the wipe pad to communicate through the major surface onto the grate 24. The cooking agent 18 facilitates the wiping removal of the residual debris and food material on the grate 24. In addition, the wipe pad 10 applies a film of the cooking agent 18 to the grate 24. The entire grate 24 is thereby cleaned and prepared for cooking by moving the wipe pad 10 in contact across the grate 24.

After the grate 24 is cleaned with the wipe pad 10 and a film of the cooking agent 18 is applied, the wipe pad 10 is detached from the grill brush 26 and is then readily discarded. It is to be appreciated that rather then immediate disposal, the wipe pad 10 may instead be turned over and reattached to the grill brush 26. The bristles 32 penetrate through the major surface of the wipe pad 10 that was in wiping contact with the grate 24. This orients the opposing fresh major surface outwardly of the grill brush 26. The grill brush 26 is again moved with the wipe 10 in contact with the grate 24 to apply a final fresh coating of the cooking agent 18. The food to be cooked is placed on the heated, cleaned, and filmed grate 24, and cooking is accomplished.

The wipe pad 10 of the present invention is made from textile fabrics, and may be treated to have a fire retardant characteristic. These textile fabrics include woven, non-woven, and knitted fabrics. The textile fabrics are reasonably dense and are air and liquid permeable. The textile fabric remains substantially together during wiping use of the wiping pad 10 on the grate 24. Non-woven fabrics however provide a reasonably dense sheet that is air and liquid permeable while being made by relatively inexpensive construction techniques. Further, the textile fabric is needle-punched to create felting or the latches 16. In the illustrated embodiment, the non-woven textile fabric is needle-punched to mechanically inter-lock the fibers of the fabric and cause the felting effect with the latches 16 extending outwardly.

Textile fabrics useful with the present invention include man-made fibers, and particularly fire retardand regenerated cellulose fibers. Other textile fabrics include those incorporating rayon fibers which are strong and absorbent (treated for fire extinguishing properties) and ARAMID fibers which have heat resistance and strength. Blends of such fibers may be useful with the present invention. The fire retardant properties allow the wipe pad 10 to be self-extinguishing in the event of contact with extreme heat or flame. One material useful with manufacture of the present invention is SRF2474-3 provided by American Non-Wovens Corporation, Columbus, Miss. This textile fabric is a non-woven fabric with a basis weight of 9½ ounces per square yard, a thickness about 100 mils, and fibers with 3 denier by 2 inch lengths of fire retardant rayon regenerated cellulose fibers.

The textile fabric for the wipe pad 10 is an air and liquid permeable material that is absorbent and allows some migration of the cooking agent 18 through the wipe pad but that tends to hold the cooking agent within the pad with limited pooling. This facilitates packaging and shipping of the wipe pads 10. It is expected that the wipe pads 10 will often be oriented vertically for a reasonable period, such as being displaying on shelves for retail sales.

The needle-punching of the material creates the plurality of latches 16 extending from the surfaces of the wipe pad 10. The latches 16 facilitate the clinging effect to attach the wipe pad 10 to the bristles 32 of the grill brush 26, as discussed above. The clinging of the latches 16 to the bristles 32 aids in holding the wipe pad 10 while moving the wipe pad 10 along the bars of the grate 24 during the cleaning and treatment process discussed above.

The basis weight of the textile fabric generally is in a range of about 6 ounces per square yard to about 10 ounces per square yard, or more, as needed for the selected thickness of the wipe pad 10.

The amount of felting, or latches 16, created by the needled-punching process is sufficient such that the wipe pad 10 is griped by the bristles 32 of the grill brush 26, but not so that the wipe pad 10 pulls out of engagement with the bristles during wiping use of the wipe pad. Too much or too little felting negatively affects the engagement of the wipe 10 with the bristles 32. The amount of latches 16 correlates generally to the needle punching process. Several factors affect the amount of felting created by needle punching, including the needle density, the needle stroke rate, and the needle penetration depth. In addition, there are textile fabric factors affecting felting, including the type of fiber, fiber denier, fiber flexural rigidity, and the density and thickness of the textile fabric, although the basis weight within a reasonable range is less of a effecting a factor.

The cooking agent 18 useful with the present invention is made of a vegetable oil that functions as both the cleaning agent and the non-stick film for the cooking surface of the grate 24. The cooking agent 18 in the illustrated embodiment is a partially hydrogenated vegetable oil containing one or more of the following oils: soy oil, canola oil, and sunflower oil; lecithin to prevent sticking; TBHQ and citric acid to preserve freshness; and dymethylpolyfiloxane as an anti-foaming agent. The cooking agent 18 in the illustrated embodiment is Archer Daniels Midland product code 103-050 for a pan and grill oil. This oil provides distinct, well-defined "grill marks" to grilled foods. Further, this product has desirable properties found with partially hydrogenated oil which is creamy thick until heated. This allows the fluid or oil to remain in place absorbed within the wipe pad 10 until the wipe pad is used on a grill.

The illustrated embodiment provides wipe pads 10 having a 10 centimeters (4 inch) length, 8.26 centimeters (3¼ inch) width, and a thickness of about 4 millimeters. Approximately 7.5 to 8 milliliters of the cooking agent 18 are applied as a thin fluidal spread over one of the major surfaces 12, 14 of the wipe pad 10. This is approximately 1½ tablespoons. A thicker wipe pad 10 may find useful with heavily coated stovetops, cooking surfaces, or grates, such as those in commercial kitchens. The wipe pad 10 is manufactured by die-cutting the wipe pads 10 from an elongate roll of textile material. Each wipe pad 10 receives approximately 1½ tablespoons of the cooking agent 18. The cooking agent 18 is applied using a pneumatic pump that transfers the cooking agent from a supply to the wipe pad 10. A spreader causes the deposited cooking agent to be spread substantially uniformly over the major surface of the wipe pad 10. The wipe pads 10 are then indexed with alternate wipe pads disposed in facing relation so that a wet side-to-wet side contact is made with pairs of the wipe pads 10. The wipe pads 10 are then packaged, for example, Three pairs of wipe pads 10 stacked together and inserted into packaging.

In an alternate embodiment, the cooking agent 18 is flavored, such as mesquite, garlic, hickory, or other flavor that enhances the taste of the food cooked on the grate 24 cleaned and coated with the cooking agent 18 from the wipe pad 10.

During use, the wipe pad 10 also applies the film of the cooking agent 18 to the grate 24. As a result, meats cooked on the grate 24 will have a more distinct "grill mark" upon initial searing, in that the film of the cooking agent 18 facilitates communication of the searing temperature from the grate 24. An embodiment in which the cooking agent 18 includes a non-sticking agent cooks foods with less sticking to the grate 24, and thereby reduce food remaining on the grate to char and affect other foods cooked on the grill thereafter. Further, it is believed that the wipe pad 10 reduces the rust of iron grates typically found on gas-fired grills. In addition, the wipe pad 10 removes burned food and other particulates from the grate 24 which might otherwise be cooked to foods and ingested.

This specification has described the present invention that provides disposable wipe pads with cleaning surfaces for cleaning cooked-on debris from cooking grills while communicating cooking agents from internal reservoirs in the wipe pads to the cooking grills for preparing the cooking grills for use in cooking foods, including the steps necessary for making and using various embodiments thereof. It is to be understood, however, that numerous changes and variations may be made in the construction of the present wipe pad within the spirit and scope of the present invention, and that modifications and changes may be made therein without departing from the scope thereof as set forth in the appended claims.

What is claimed is:

1. A wipe pad for cleaning debris from a cooking grill while preparing the cooking grill for use in cooking foods, comprising:
    a sheet of an absorbent fire retardant material;
    a cooking agent received by the sheet;
    whereby the sheet, being attached to a grill brush by a plurality of bristles extending therefrom and partially penetrating the sheet, clings thereto for wiping contact of the sheet against the cooking grill upon movement of the grill brush to clean cooking debris from the cooking grill while the cooking agent communicates from the sheet as a film onto the cooking grill to prepare the cooking grill for use.

2. The wipe pad as recited in claim 1, wherein the sheet is needle-punched to define a plurality of fibrous latches extending from a surface of the sheet, whereby the latches facilitate the sheet clinging to the bristles.

3. The wipe pad as recited in claim 1, wherein the sheet is a textile fabric.

4. The wipe pad as recited in claim 3, wherein the textile fabric is a non-woven fabric.

5. The wipe pad as recited in claim 1, wherein material comprises rayon fibers.

6. The wipe pad as recited in claim 1, wherein the material comprises aramid fibers.

7. The wipe pad as recited in claim 1, wherein the sheet comprises a cellulose material.

8. The wipe pad as recited in claim 1, wherein the sheet is about 4 millimeters thick.

9. The wipe pad as recited in claim 1, wherein the cooking agent comprises a partially hydrogenated oil.

10. The wipe pad as recited in claim 9, wherein the cooking agent further comprises a non-sticking agent.

11. The wipe pad as recited in claim 10, wherein the non-sticking agent comprises lecithin.

12. The wipe pad as recited in claim 9, wherein the cooking agent comprises a vegetable oil to facilitate defining grill marks in grilled foods.

13. The wipe pad as recited in claim 12, wherein the vegetable oil is selected from one or more of the group comprising soil oil, canola oil, and sunflower oil.

14. The wipe pad as recited in claim 1, wherein the cooking agent further comprises a flavoring agent.

15. A wipe pad for cleaning debris from a cooking grill while preparing the cooking grill for use in cooking foods, comprising:
    a textile fabric sheet of an absorbent fire retardant material needle-punched to define a plurality of fibrous latches extending from a major surface of the sheet;
    a cooking agent received by the sheet, whereby the sheet, being attached to a grill brush by a plurality of bristles extending therefrom and partially penetrating the sheet, clings thereto aided by the latches for wiping contact of the sheet against the cooking grill upon movement of the grill brush to clean cooking debris from the cooking grill while the cooking agent communicates from the sheet onto the cooking grill to prepare the cooking grill for use.

16. The wipe pad as recited in claim 15, wherein the textile fabric sheet is a non-woven fabric.

17. The wipe pad as recited in claim 15, wherein the cooking agent is a fluidal cooking oil.

18. The wipe pad as recited in claim 17, wherein the cooking agent further comprises a non-sticking agent.

19. The wipe pad as recited in claim 18, wherein the non-sticking agent is lecithin.

20. The wipe pad as recited in claim 17, wherein the cooking agent further comprises a flavoring agent.

21. A method of preparing a cooking grill for use in cooking foods, comprising the steps of:
  (a) attaching a sheet of an absorbent fire retardant material to a handle by partially piercing the sheet with a plurality of bristles extending from the handle, the sheet receiving a cleaning and cooking agent;
  (b) moving the handle to bring a surface of the sheet into moving contact with a cooking grill, while the cleaning and cooking agent communicates from the sheet to cooperatively dislodge debris in cleaning the cooking grill while leaving a film of the cooking agent thereon for cooking foods.

* * * * *

UNITED STATES PATENT AND TRADEMARK OFFICE
CERTIFICATE OF CORRECTION

PATENT NO. : 6,916,382 B1
DATED : July 12, 2005
INVENTOR(S) : Keith Aldredge

It is certified that error appears in the above-identified patent and that said Letters Patent is hereby corrected as shown below:

<u>Column 6,</u>
Line 2, cancel beginning with "1. A wipe pad" to and including "a flavoring agent." and insert the following claims:

1. A wipe device for cleaning debris from a cooking grill while preparing the cooking grill for use in cooking foods, comprising:
   a sheet of an absorbent fire retardant material;
   a cooking agent received by the sheet; and
   a grill brush having a plurality of bristles extending therefrom and partially penetrating the sheet which clings thereto for wiping contact of the sheet against the cooking grill upon movement of the grill brush to clean cooking debris from the cooking grill while the cooking agent communicates from the sheet as a film onto the cooking grill to prepare the cooking grill for use.

2. The wipe device as recited in claim 1, wherein the sheet is needle-punched to define a plurality of fibrous latches extending from a surface of the sheet, whereby the latches facilitate the sheet clinging to the bristles.

3. The wipe device as recited in claim 1, wherein the sheet is a textile fabric.

4. The wipe device as recited in claim 3, wherein the textile fabric is a non-woven fabric.

5. The wipe device as recited in claim 1, wherein material comprises rayon fibers.

6. The wipe device as recited in claim 1, wherein the material comprises aramid fibers.

7. The wipe device as recited in claim 1, wherein the sheet comprises a cellulose material.

8. The wipe device as recited in claim 1, wherein the sheet is about 4 millimeters thick.

9. The wipe device as recited in claim 1, wherein the cooking agent comprises a partially hydrogenated oil.

10. The wipe device as recited in claim 9, wherein the cooking agent further comprises a non-sticking agent.

11. The wipe device as recited in claim 10, wherein the non-sticking agent comprises lecithin.

12. The wipe device as recited in claim 9, wherein the cooking agent comprises a vegetable oil to facilitate defining grill marks in grilled foods.

13. The wipe device as recited in claim 12, wherein the vegetable oil is selected from one or more of the group comprising soy oil, canola oil, and sunflower oil.

14. The wipe device as recited in claim 1, wherein the cooking agent further comprises a flavoring agent.

UNITED STATES PATENT AND TRADEMARK OFFICE
CERTIFICATE OF CORRECTION

PATENT NO.    : 6,916,382 B1
DATED         : July 12, 2005
INVENTOR(S)   : Keith Aldredge It is certified that error appears in the above-identified patent and that said Letters Patent is hereby corrected as shown below:

<u>Column 8,</u>
Line 7, insert the following claims:

22. A wipe pad for cleaning debris from a cooking grill while preparing the cooking grill for use in cooking foods, comprising:
   a sheet of an absorbent fire retardant material defining a plurality of fibrous latches extending from a surface of the sheet;
   a cooking agent received by the sheet,
   whereby the sheet, being attached to a grill brush by a plurality of bristles extending therefrom and partially penetrating the sheet, clings thereto for wiping contact of the sheet against the cooking grill upon movement of the grill brush to clean cooking debris from the cooking grill while the cooking agent communicates from the sheet as a film onto the cooking grill to prepare the cooking grill for use.

23. The wipe pad as recited in claim 22, wherein the latches are formed by needle-punching the sheet.

24. The wipe pad as recited in claim 22, wherein the sheet is a textile fabric.

25. The wipe pad as recited in claim 24, wherein the textile fabric is a non-woven fabric.

26. The wipe pad as recited in claim 22, wherein material comprises rayon fibers.

27. The wipe pad as recited in claim 1, wherein the material comprises aramid fibers.

28. The wipe pad as recited in claim 22, wherein the sheet comprises a cellulose material.

29. The wipe pad as recited in claim 22, wherein the sheet is about 4 millimeters thick.

30. The wipe pad as recited in claim 22, wherein the cooking agent comprises a partially hydrogenated oil.

31. The wipe pad as recited in claim 30, wherein the cooking agent further comprises a non-sticking agent.

32. The wipe pad as recited in claim 31, wherein the non-sticking agent comprises lecithin.

33. The wipe pad as recited in claim 30, wherein the cooking agent comprises a vegetable oil to facilitate defining grill marks in grilled foods.

UNITED STATES PATENT AND TRADEMARK OFFICE
CERTIFICATE OF CORRECTION

PATENT NO.  : 6,916,382 B1
DATED       : July 12, 2005
INVENTOR(S) : Keith Aldredge It is certified that error appears in the above-identified patent and that said Letters Patent is hereby corrected as shown below:

Column 8 (cont'd),

34. The wipe pad as recited in claim 33, wherein the vegetable oil is selected from one or more of the group comprising soy oil, canola oil, and sunflower oil.

35. The wipe pad as recited in claim 22, wherein the cooking agent further comprises a flavoring agent.

Signed and Sealed this

Eighteenth Day of October, 2005

JON W. DUDAS
*Director of the United States Patent and Trademark Office*